(12) United States Patent
Lin

(10) Patent No.: US 8,366,339 B2
(45) Date of Patent: Feb. 5, 2013

(54) TWO-SECTION TOOL JOINT

(76) Inventor: Hsiu-Nien Lin, Taichung (TW)

( * ) Notice: Subject to any disclaimer, the term of this patent is extended or adjusted under 35 U.S.C. 154(b) by 0 days.

(21) Appl. No.: 13/269,355

(22) Filed: Oct. 7, 2011

(65) Prior Publication Data

US 2012/0027505 A1 Feb. 2, 2012

Related U.S. Application Data

(63) Continuation-in-part of application No. 12/413,582, filed on Mar. 29, 2009, now abandoned.

(51) Int. Cl.
*F16D 3/00* (2006.01)
(52) U.S. Cl. ............ 403/57; 81/177.75; 464/159
(58) Field of Classification Search ............ 464/158, 464/159, 106; 81/177.75, 177.85; 403/57, 403/90, 114, 115
See application file for complete search history.

(56) References Cited

U.S. PATENT DOCUMENTS

| | | | |
|---|---|---|---|
| 5,069,569 A | 12/1991 | Lieser | |
| 5,738,586 A * | 4/1998 | Arriaga | 81/177.75 |
| 6,729,211 B1 | 5/2004 | Snow | |
| 7,278,342 B1 | 10/2007 | Chang | |
| 7,430,943 B2 * | 10/2008 | Chiang | 81/177.7 |
| 7,966,915 B2 * | 6/2011 | Chen | 81/177.75 |

FOREIGN PATENT DOCUMENTS

JP 2004237420 8/2004

* cited by examiner

*Primary Examiner* — Michael P Ferguson
*Assistant Examiner* — Daniel Wiley
(74) *Attorney, Agent, or Firm* — Muncy, Geissler, Olds & Lowe, PLLC

(57) ABSTRACT

A two-section tool joint comprises a support member including a polygonal ball knob disposed on one end thereof; an acting head including a receiving chamber fixed on end thereof, and on a side wall of the receiving chamber being arranged a plurality of raised rims in response to the ball knob; a limiting structure defined between the support member and the acting head so that the ball knob of the support member is limited in the receiving chamber and moves between a first and a second positions; wherein the raised rims are longitudinally defined on a side wall of the receiving chamber and spaced apart equally from each other, the number of the raised rims is in response to that of the angles of the ball knob, and each raised rim is provided with a convex arc contacting surface so that the support member rotates with the acting head.

15 Claims, 6 Drawing Sheets

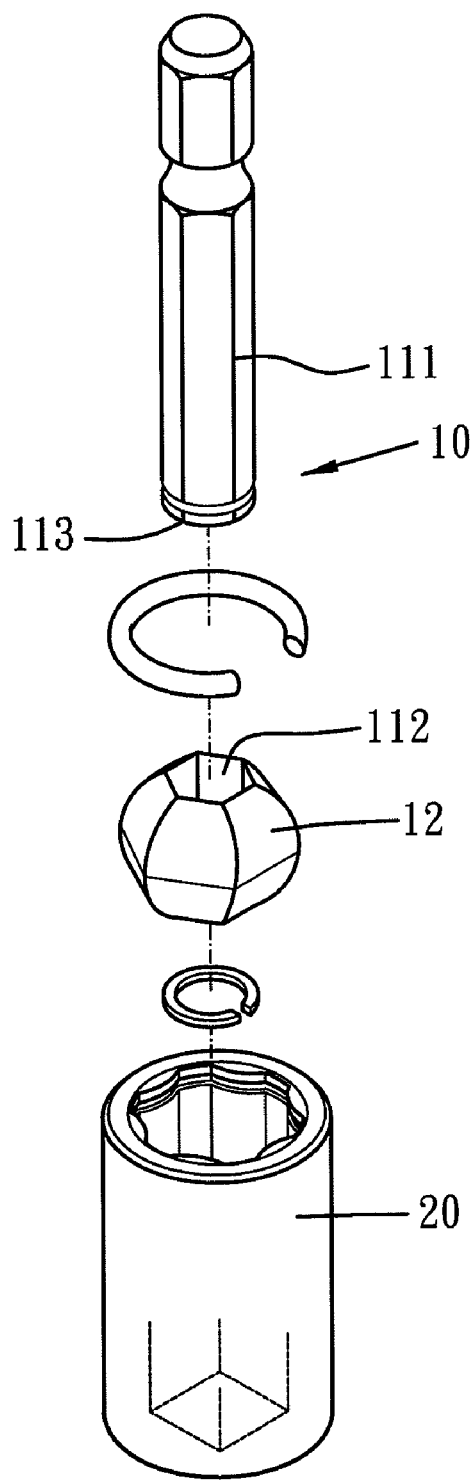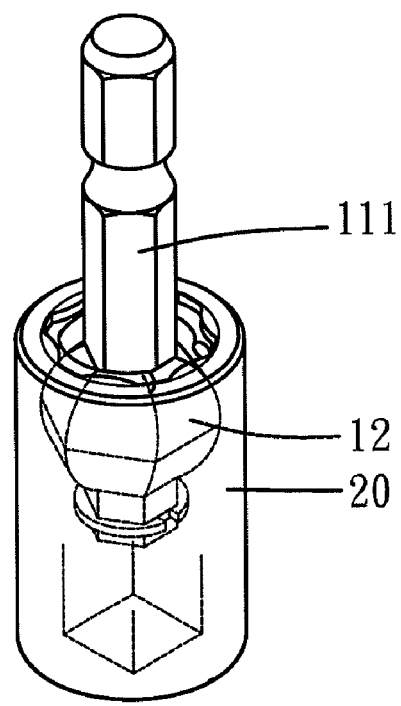
FIG. 6
FIG. 7

TWO-SECTION TOOL JOINT

BACKGROUND OF THE INVENTION

1. Field of the Invention

The present invention is a CIP of application Ser. No. 12/413,582, filed Mar. 29, 2009 now abandoned, the entire contents of which are hereby incorporated by reference.

2. Description of the Prior Art

The JP Publication No. P2004-237420 discloses that a polygonal ball knob of a support member included in a tool joint is received in a receiving chamber of an acting head, and a shape of the receiving chamber is in response to that of the ball knob to form a polygon shape. Besides, a connection structure is used to engage the acting head with the support member together when the support member is pressed therein. When the support member is pulled out, the support member swings pivotally relative to the acting head.

However, because an inner wall of the receiving chamber is formed in a polygon shape, the ball knob contacts with the inner wall of the receiving chamber surface by surface. When a driving device is turned on, the acting head is driven to rotate at high speed by the support member so as to drive a threaded member to rotate. In working condition, driving force of the driving device may be increased to drive threaded member to rotate, so that the ball knob is always stuck and failed in the receiving chamber of the action head.

To avoid failure and inoperation of the knob and the acting head, a joint is provided in U.S. Pat. No. 5,069,569. The joint has a female part which is formed with a polygonal opening whose side surfaces includes several convex surfaces. Thus, edges of knob may not be crushed, scuffed, or wedged.

However, the female part of the joint described in U.S. Pat. No. 5,069,569 would be probably crushed easily because of its appearance. The circumferentially arranged surfaces of the opening of the female part are convex inwardly. Thus, corners between any two adjacent convex surfaces would be sharpened. Serious stress concentration would take the places where the corners are. As a result, the female part would be cracked or formed with rifts by a regular punching of rotation easily.

The present invention has arisen to mitigate and/or obviate the afore-described disadvantages.

SUMMARY OF THE INVENTION

The primary object of the present invention is to provide a two-section tool joint that can operate its acting head smoothly to enhance operational efficiency.

A two-section tool joint in accordance with the present invention comprises:

a support member including a polygonal ball knob disposed on one end thereof;

an acting head including a receiving chamber fixed on end thereof, and on a side wall of the receiving chamber being arranged a plurality of raised rims in response to the ball knob; and a limiting structure defined between the support member and the acting head so that the ball knob of the support member is limited in the receiving chamber and moves between a first and a second positions;

wherein the raised rims are longitudinally defined on a side wall of the receiving chamber, the number of the raised rims is in response to that of the angles of the ball knob, and each raised rim is provided with a convex arc contacting surface so that the support member is adapted to be rotated by the acting head;

wherein any two adjacent convex arc contacting surfaces are separated and connected by a concave arc surface, the concave arc surfaces are formed longitudinally in the receiving chamber, the concave arc surfaces are facing the receiving chamber;

wherein any two adjacent convex arc contacting surfaces define no extension encounter point which is located in an appearance of the acting head;

wherein as the support member is pressed toward the first position, the support member is assembled together with the acting head;

wherein as the support member is slightly pulled toward the second position, the support member can swing relative to the acting head by using the ball knob as its pivot point.

BRIEF DESCRIPTION OF THE DRAWINGS

FIG. 6 is a perspective view showing the exploded components of a two-section tool joint in accordance with a second embodiment of the present invention;

FIG. 7 is a perspective view showing the assembly of the two-section tool joint in accordance with the second embodiment of the present invention;

DETAILED DESCRIPTION OF THE PREFERRED EMBODIMENTS

Figure 1A:
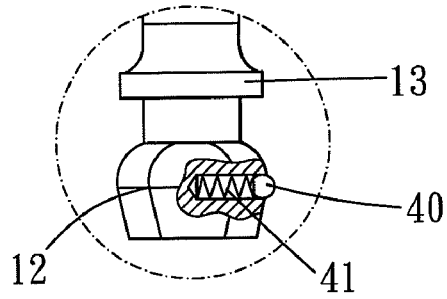
FIG. 1A is a cross sectional view of a part of FIG. 1.
Figure 1:
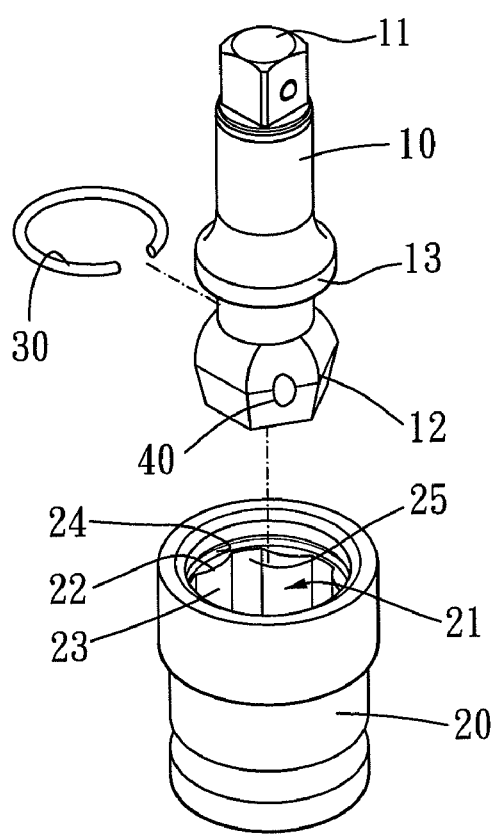
FIG. 1 is a perspective view showing the exploded components of a two-section tool joint in accordance with a first embodiment of the present invention.
Figure 2:
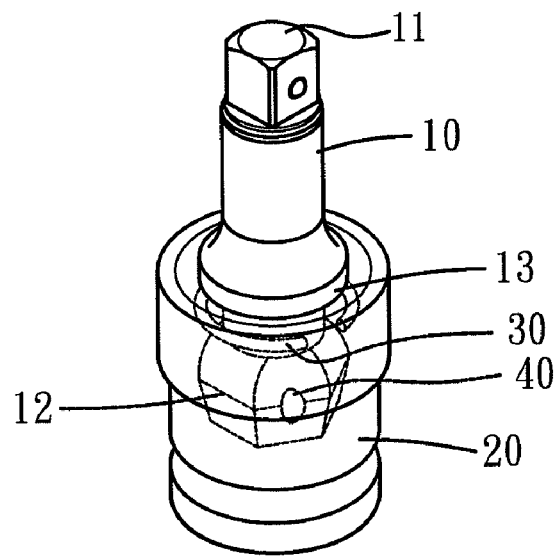
FIG. 2 is a perspective view showing the assembly of the two-section tool joint in accordance with the first embodiment of the present invention.

The present invention will be clearer from the following description when viewed together with the accompanying drawings, which show, for purpose of illustrations only, the preferred embodiment in accordance with the present invention. Referring to FIGS. 1, 1A, and 2, a two-section tool joint in accordance with the present invention comprises: a support member 10, an acting head 20, and a limiting structure 30; wherein the support member 10 includes a polygonal ball knob 12 disposed on one end thereof and a driving portion 11 mounted on another end thereof, the driving portion 11 is provided to couple a driving device and used in electronic driving tools (such as an electronic screwdriver, an electronic drill) or in hand tools (such as an open-end wrench, a socket wrench, or a screwdriver);

the acting head 20 includes a receiving chamber 21 fixed on end thereof, and another end of the acting head 20 is used to receive a tool, such as a socket, a screwdriver, various types of drills, etc., and on a side wall of the receiving chamber 21 are arranged a plurality of raised rims 22 in response to the ball knob 12. Specifically, the raised rims 22 are longitudinally defined on the side wall of the receiving chamber 21 and are spaced apart equally from each other, the number of the raised rims 22 is in response to that of the angles of the ball knob 12 (In this embodiment, the number of the angles is six,) and each raised rim 22 is provided with a convex arc contacting surface 23 to contact with the ball knob 12, hence the support member 10 can be rotated by the acting head 20 or the acting head 20 can be rotated by the support member 10.

Figure 1B:
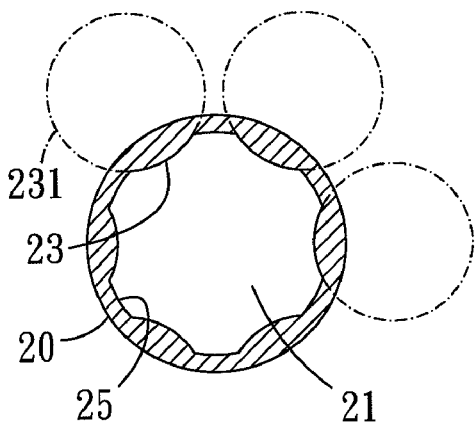
FIG. 1B is a cross sectional view of another part of FIG. 1.

Note that any two adjacent convex arc contacting surfaces 23 are separated and connected by a concave arc surface 25, and the concave arc surfaces 25 are formed longitudinally in the receiving chamber 21, as shown in FIGS. 1 and 1B. Preferably, the concave arc surfaces 25 and the acting head 20 are concentric. The concave arc surfaces 25 are facing the receiving chamber 21. Thus, no sharpen corner would be formed between any two adjacent convex arc contacting surfaces 23. Stress concentration would be greatly alleviated. That is to say, the acting head 20 is durable and lifetime is prolonged since the concave arc surfaces 25 are brought in.

Figure 1C:
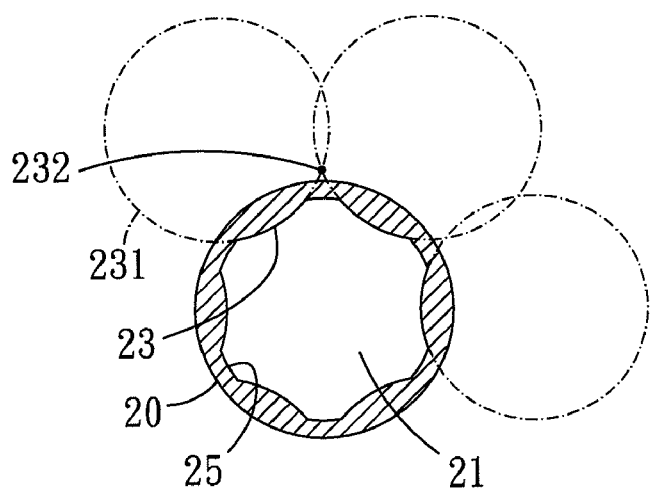
FIG. 1C is a cross sectional view of an acting head of another embodiment of the present invention.

Further note that in a lateral cross-section view, any two adjacent convex arc contacting surfaces 23 define no extension encounter point which is located in an appearance of the acting head 20. More particularly, in a lateral cross-section view, as shown in FIG. 1B, each of the convex arc contacting surfaces 23 is shown as an arc line. As we look into the extension lines 231 of the arc lines, it should be noticed that each of the extension lines 231 encounters with no one another. Thus, the convex arc contacting surfaces 23 would obtain curvature which is large enough for clamping the knob 12 tightly. In other possible embodiments of the present invention, as shown in FIG. 1C, the extension lines 231 may encounter with one another by an extension encounter point 232. However, the extension encounter point 232 should locate out of an appearance of the acting head 20.

Figure 4:
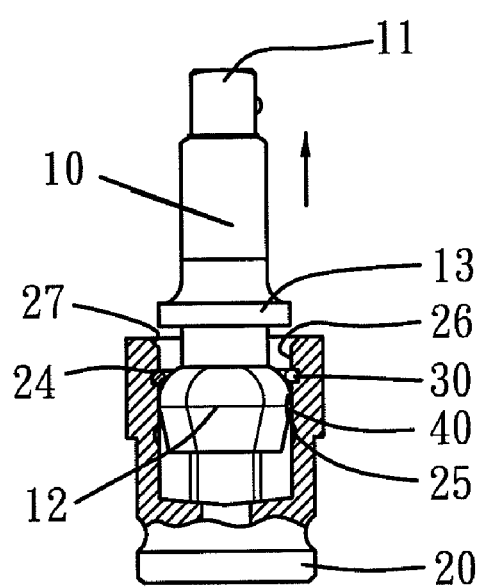
FIG. 4 is a partial cross sectional view showing the support member being located at a second position in accordance with the first embodiment of the present invention.

Each of the contacting surfaces 23 includes a central axis (e.g., a central line of the contacting surface 23), and the central axes of the contacting surfaces 23 are parallel to each other, e.g., a distance between any two raised rims 22 is equal to facilitate working and assembling processes, as shown in FIGS. 1 and 1B. Besides, the distance can be reduced or increased gradually. In the meantime, the central axes are not parallel to each other. At a suitable position of the receiving chamber 21 is arranged a limiting recess 25 (as shown in FIG. 4), the limiting recess 25 can be disposed in a spot arrangement or surrounds around the side wall of the receiving chamber 21. At a largest diameter of the ball knob 12 is radially mounted a receiving bore in which an engaging member 40 is fixed, between the receiving bore and the engaging member 40 is defined a resilient element 41, two ends of the resilient element 41 are abutted against the receiving bore and the engaging member 40 individually so that the engaging member 40 can move toward an opening of the receiving bore at any time.

Furthermore, the limiting structure 30 is defined between the support member 10 and the acting head 20 so that the ball knob 12 of the support member 10 is limited in the receiving chamber 21 and moves between a first and a second positions. It is preferable that the limiting structure 30 is a C-shaped retainer (as illustrated in FIG. 1) or a circular liner, the C-shaped retainer of the limiting structure 30 is mounted in an annular groove 24 of the receiving chamber 21, and the annular groove 24 is located above the raised rims 22.

The tool joint of the present invention can be used in a two-section manner. For example, as the support member 10 is located at the first position or the second position, different functions are achieved. Specifically, as the support member 10 is pressed toward the first position, the support member 10 is assembled together with the acting head 20 to prevent the support member 10 from shock. As the support member 10 is slightly pulled toward the second position, the support member 10 can swing relative to the acting head 20 by using the ball knob 12 as its pivot point, enabling to operate the tool joint in a limited space.

Referring to FIGS. 1-5, a two-section tool joint in accordance with a first embodiment of the present invention comprises a circular fringe 13 radially extending from the support member 10, and the receiving chamber 21 includes an annular abutting periphery 26 mounted on the opening thereof, a diameter of the circular fringe 13 is substantially equal to an inner diameter of the abutting periphery 26, thereby the fringe 13 can be engageably received in a space surrounded by the abutting periphery 26.

Figure 3:
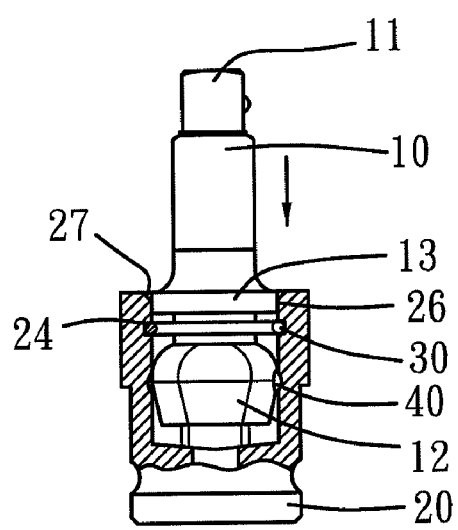
FIG. 3 is a partial cross sectional view showing the support member being located at a first position in accordance with the first embodiment of the present invention.

As shown in FIG. 3, as the support member 10 is located at the first position, the fringe 13 engages with the abutting periphery 26 so as to limit the shock of the support member 10. At that time, the engaging member 40 is defined in the limiting recess 25 to position the support member 10 at the first position.

Figure 5:
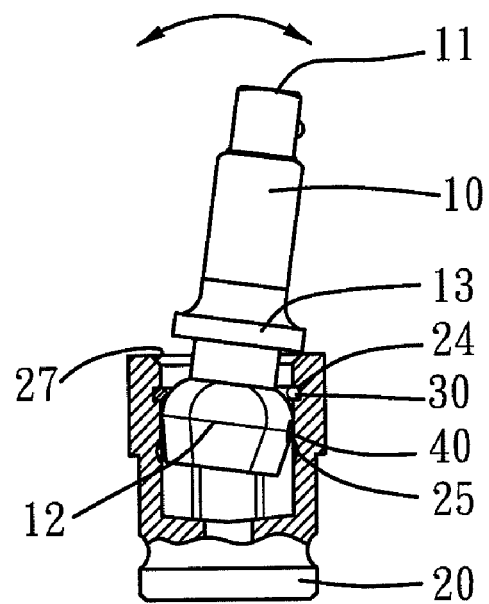
FIG. 5 is a partial cross sectional view showing the support member being located at the second position and becoming inclined in accordance with the first embodiment of the present invention.

With reference to FIGS. 4 and 5, as the support member 10 is slightly pulled toward the second position, the fringe 13 disengages from the abutting periphery 26, and because an outer surface of the ball knob 12 is formed in a curved surface shape, the support member 10 can swing in relation to the acting head 20 by using the ball knob 12. It is to be noted that although the support member 10 can swing with respect to the acting head 20 but not rotate with the acting head 20 so as to rotatably lock a locking element. Moreover, to swing the support member 10 more smoothly, on the opening of the receiving chamber 21 is provided a circular chamfer 27 which can be formed in an inclined surface or an actuated surface shape. Also, the engaging member 40 is located outside the limiting recess 25 and makes the support member 10 slant automatically.

As shown in FIGS. 6-10, a tool joint according to a second embodiment of the present invention comprises a support member 10 having a shaft 111, a laterally cross section of which is formed in an noncircular shape, and the polygonal ball knob 12 including a centrally through hole 112, a shape of which is in response to a profile of the shaft 111 so that the shaft 111 can rotate with the ball knob 12. The shaft 111 includes a connecting end 113 which extends out of the through hole 112, and the acting head 20 further includes a coupling slot 211 in communication with the receiving chamber 21, and a shape of the coupling slot 211 corresponds to a profile of the connecting end 113.

Figure 8:
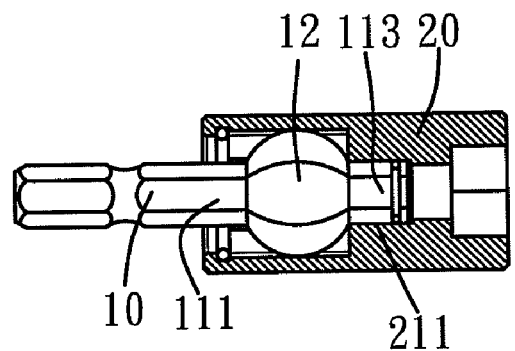
FIG. 8 is a partial cross sectional view showing the support member being located at a first position in accordance with the second embodiment of the present invention.

Thereby, as the support member 10 is located at the first position as illustrated in FIG. 8, the connecting end 113 is received in the coupling slot 211 so as to limit the support member 12 not to swing relative to the acting head 20, and the shaft 111, the ball knob 12, and the acting head 20 can rotate together.

Besides, as the support member 10 is located at the second position, the connecting end 113 disengages from the coupling slot 211 so that the support member 10 can swing with respect to the acting head 20.

Figure 11:
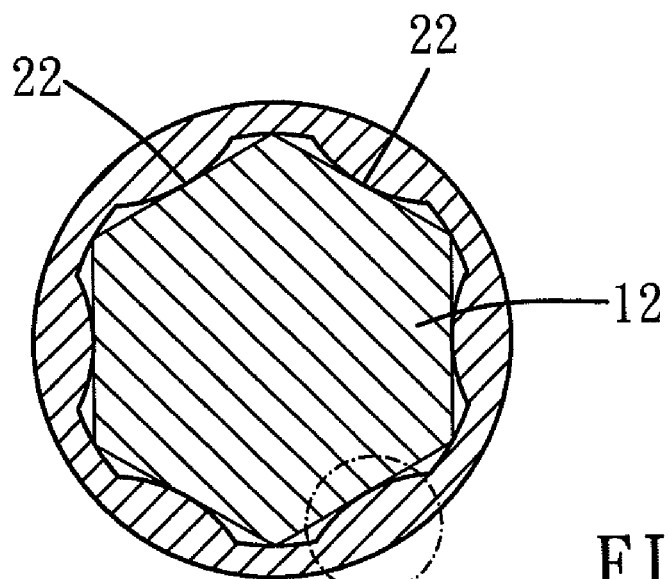
FIG. 11 is a cross sectional view showing a largest diameter of a polygonal ball knob of the present invention.
Figure 11A:
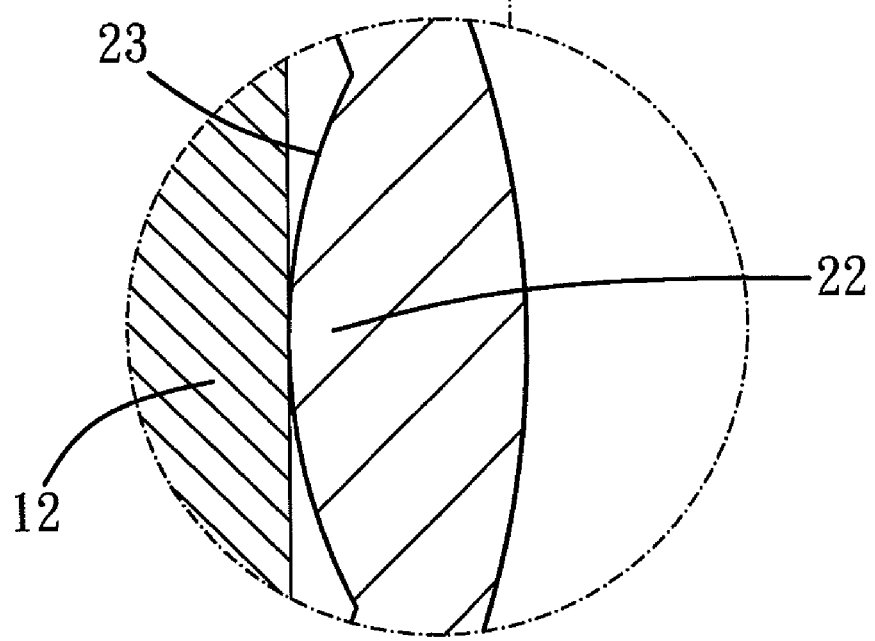
FIG. 11A is an amplified view of a part of FIG. 11.

In the present invention, due to the raised rims 22 are fixed on the side wall of the receiving chamber 21, and each raised rim 22 is provided with a convex arc contacting surface 23, accordingly as shown in FIGS. 11 and 11A, the ball knob 12 contacts with the receiving chamber 21 point by point instead of surface by surface. Also, because the raised rims 22 are spaced apart equidistantly, a gap between the two raised rims 22 is generated to swing the ball knob 12, thus smoothly swinging the support member 10 in relation to the acting head 20. For clearly showing the present invention, the largest diameter of the ball knob 12 is drawn to equal to the distance between the two raised rims 22. However, it is preferable that the largest diameter of the ball knob 12 is slightly smaller than the distance between the two raised rims 22, swinging the support member 10 smoothly.

Figure 9:
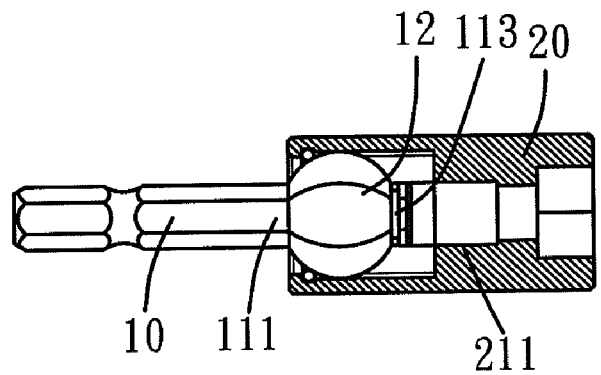
FIG. 9 is a partial cross sectional view showing the support member being located at a second position in accordance with the second embodiment of the present invention.
Figure 10:
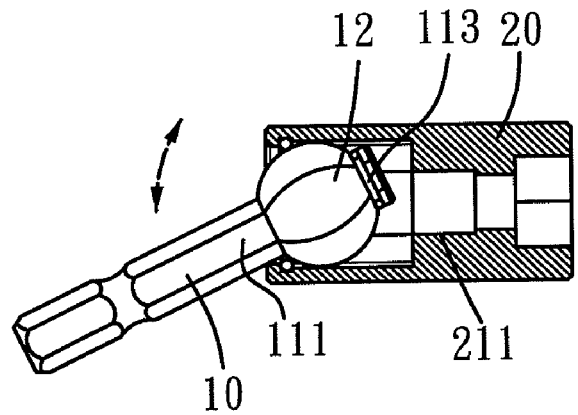
FIG. 10 is a partial cross sectional view showing the support member being located at the second position and becoming inclined in accordance with the second embodiment of the present invention.

As illustrated in FIGS. 9 and 10, as the support member 10 is located at the second position, the connecting end 113 disengages from the coupling slot 211 so that the support member 10 can swing with respect to the acting head 20.

As such, in comparison with the conventional structures that an angle is formed between two lateral sides, in the present invention, there are concave surfaces 25 being formed between any two of the convex arc contacting surfaces 23, so that structure strength is enhanced. Further, more lubricant could be contained in the receiving chamber 21. Thus, friction between the receiving chamber 21 and the ball knob 12 is decreased. Moreover, as far as an effect of stress concentration is concerned, the concave surfaces 25 effectively reduce the effect of stress concentration during operation, so that forces resulted from the operation could be evenly distributed to the convex arc contacting surfaces 23. As a result, a joint of the two convex arc contacting surfaces 23 is protected from cracking or forming rifts so as to elongate lifetime of the present invention.

While we have shown and described various embodiments in accordance with the present invention, it is clear to those skilled in the art that further embodiments may be made without departing from the scope of the present invention.

What is claimed is:

1. A two-section tool joint comprising:
a support member including a first end and an opposing second end, wherein a polygonal ball knob having a plurality of sides is disposed adjacent said first end;
an acting head including a receiving chamber disposed in an upper end thereof, wherein said polygonal ball knob is received in said receiving chamber, and wherein a plurality of raised rims are arranged circumferentially on an inner side wall of the receiving chamber, and wherein the number of said plurality of raised rim corresponds to the number of sides of said polygonal ball knob; and
a limiting structure seated within the inner side wall of the receiving chamber adjacent the upper end of the acting head, wherein said limiting structure retains the ball knob of the support member within the receiving chamber in such a manner that the support member is moveable between a first position, in which the support member is fixedly engaged with the acting head, and a second position, in which the support member can swing relative to the acting head by pivoting about the ball knob;
wherein the raised rims are longitudinally defined on said inner side wall of the receiving chamber, and each raised rim comprises a convex arc contacting surface engaging with a corresponding side of said ball knob so that the support member and the acting head are rotationally locked;
wherein any two adjacent convex arc contacting surfaces are separated and connected by a concave arc surface, whereby the concave arc surfaces are formed longitudinally in the inner side wall of the receiving chamber;
wherein each convex arc contacting surface defines a center point and a radius of curvature, such that the plurality of convex arc contacting surfaces define a plurality of circles arranged circumferentially about the acting head, each circle having the same center point and radius as a respective one of the plurality of convex arc contacting surfaces, and wherein in a lateral cross-section view, no two adjacent circles intersect.

2. The two-section tool joint as claimed in claim 1, wherein the concave arc surfaces and the acting head are concentric.

3. The two-section tool joint as claimed in claim 1, wherein the limiting structure is a C-shaped retainer, the C-shaped retainer is mounted in an annular groove of the inner side wall of the receiving chamber, and the annular groove is located above the raised rims adjacent the upper end of the acting head.

4. The two-section tool joint as claimed in claim 1, wherein a circular fringe extends radially outwardly from the support member between said first end and said second end, and the receiving chamber includes an annular abutting periphery disposed at an opening thereof adjacent said upper end, wherein an outer diameter of the circular fringe is substantially equal to an inner diameter of the annular abutting periphery, thereby as the support member is located at the first position, the circular fringe engages with the annular abutting periphery, and as the support member is located at the second position, the circular fringe disengages from the annular abutting periphery.

5. The two-section tool joint as claimed in claim 1, wherein on the opening of the receiving chamber is provided a circular chamfer.

6. The two-section tool joint as claimed in claim 1, wherein within the receiving chamber is arranged a limiting recess, and at a largest diameter of the ball knob is radially mounted a receiving bore in which an engaging member is fixed, between the receiving bore and the engaging member is defined a resilient element which is abutted against the receiving bore and the engaging member, wherein as the support member is located at the first position, the engaging member is engaged in the limiting recess, and as the support member is located at the second position, the engaging member is located outside the limiting recess.

7. The two-section tool joint as claimed in claim 2, wherein within the receiving chamber is arranged a limiting recess, and at a largest diameter of the ball knob is radially mounted a receiving bore in which an engaging member is fixed, between the receiving bore and the engaging member is defined a resilient element which is abutted against the receiving bore and the engaging member, wherein as the support member is located at the first position, the engaging member is engaged in the limiting recess, and as the support member is located at the second position, the engaging member is located outside the limiting recess.

8. The two-section tool joint as claimed in claim 3, wherein within the receiving chamber is arranged a limiting recess, and at a largest diameter of the ball knob is radially mounted a receiving bore in which an engaging member is fixed, between the receiving bore and the engaging member is defined a resilient element which is abutted against the receiving bore and the engaging member, wherein as the support member is located at the first position, the engaging member is engaged in the limiting recess, and as the support member is located at the second position, the engaging member is located outside the limiting recess.

9. The two-section tool joint as claimed in claim 4, wherein within the receiving chamber is arranged a limiting recess, and at a largest diameter of the ball knob is radially mounted a receiving bore in which an engaging member is fixed, between the receiving bore and the engaging member is defined a resilient element which is abutted against the receiving bore and the engaging member, wherein as the support member is located at the first position, the engaging member is engaged in the limiting recess, and as the support member is located at the second position, the engaging member is located outside the limiting recess.

10. The two-section tool joint as claimed in claim 5, wherein within the receiving chamber is arranged a limiting recess, and at a largest diameter of the ball knob is radially mounted a receiving bore in which an engaging member is fixed, between the receiving bore and the engaging member is defined a resilient element which is abutted against the receiving bore and the engaging member, wherein as the support member is located at the first position, the engaging member is engaged in the limiting recess, and as the support member is located at the second position, the engaging member is located outside the limiting recess.

11. The two-section tool joint as claimed in claim 1, wherein each of the convex arc contacting surfaces includes a central axis, and the central axes of the contacting surfaces are parallel to each other.

12. The two-section tool joint as claimed in claim 2, wherein each of the convex arc contacting surfaces includes a central axis, and the central axes of the contacting surfaces are parallel to each other.

13. The two-section tool joint as claimed in claim 3, wherein each of the convex arc contacting surfaces includes a central axis, and the central axes of the contacting surfaces are parallel to each other.

14. The two-section tool joint as claimed in claim 4, wherein each of the convex arc contacting surfaces includes a central axis, and the central axes of the contacting surfaces are parallel to each other.

15. The two-section tool joint as claimed in claim 5, wherein each of the convex arc contacting surfaces includes a central axis, and the central axes of the contacting surfaces are parallel to each other.

* * * * *